US008656356B2

(12) United States Patent
Roy et al.

(10) Patent No.: US 8,656,356 B2
(45) Date of Patent: Feb. 18, 2014

(54) METHOD AND SYSTEM FOR CREATING OWL ONTOLOGY FROM JAVA

(75) Inventors: Suman Roy, Kolkata (IN); Ming Fei Yan, Singapore (SG)

(73) Assignee: Infosys Limited (IN)

( * ) Notice: Subject to any disclaimer, the term of this patent is extended or adjusted under 35 U.S.C. 154(b) by 150 days.

(21) Appl. No.: 13/046,944

(22) Filed: Mar. 14, 2011

(65) Prior Publication Data

US 2012/0005655 A1 Jan. 5, 2012

(30) Foreign Application Priority Data

Jul. 2, 2010 (IN) .......................... 1868/CHE/2010

(51) Int. Cl.
*G06F 9/44* (2006.01)

(52) U.S. Cl.
USPC ........... 717/123; 717/104; 717/106; 717/108; 717/110; 717/112; 717/126; 717/136; 717/137

(58) Field of Classification Search
None
See application file for complete search history.

(56) References Cited

U.S. PATENT DOCUMENTS

| | | | | |
|---|---|---|---|---|
| 7,606,785 B1 * | 10/2009 | Shirriff | ........................... | 706/59 |
| 7,987,088 B2 * | 7/2011 | Moitra et al. | ................... | 704/10 |
| 8,538,904 B2 * | 9/2013 | Fokoue et al. | ................. | 706/47 |
| 2003/0163450 A1 * | 8/2003 | Borenstein et al. | ............... | 707/1 |
| 2007/0050343 A1 * | 3/2007 | Siddaramappa et al. | ......... | 707/3 |
| 2007/0233457 A1 * | 10/2007 | Kang et al. | ........................ | 704/8 |
| 2007/0233627 A1 * | 10/2007 | Dolby et al. | .................... | 706/45 |
| 2009/0012842 A1 * | 1/2009 | Srinivasan et al. | .............. | 705/10 |
| 2009/0249294 A1 * | 10/2009 | Ocke et al. | ..................... | 717/117 |
| 2010/0010974 A1 * | 1/2010 | Chieu et al. | ....................... | 707/4 |
| 2010/0228782 A1 * | 9/2010 | Rao et al. | ...................... | 707/794 |
| 2011/0113069 A1 * | 5/2011 | Morgan | ........................ | 707/794 |
| 2011/0119310 A1 * | 5/2011 | Kolovski et al. | .............. | 707/794 |
| 2012/0161940 A1 * | 6/2012 | Taylor | ........................ | 340/10.3 |

OTHER PUBLICATIONS

Bartalos et al., "An approach to object-ontology mapping", 2007, Slovak University of Technology.*
Horridge et al., "A practical guide to building OWL ontologies using Protégé 4 and CO-ODE tools", Edition 1.1, The University of Manchester, Oct. 16, 2007, pp. 25, 35, 50 (at least).*

(Continued)

*Primary Examiner* — Don Wong
*Assistant Examiner* — Adam Conkey
(74) *Attorney, Agent, or Firm* — Lerner, David, Littenberg, Krumholz & Mentlik, LLP

(57) ABSTRACT

A method, system, and computer program product are disclosed for creating an OWL ontology from a Java source code, wherein the Java source code includes a plurality of Java classes. Each of these Java classes includes one or more Java members and one or more Java objects. The Java objects are used to instantiate each of the Java classes. An OWL class is created for each of the Java classes, and an OWL concept is created for each of the Java members. Further, an OWL instance is created for each of the Java objects. Each of the OWL classes, the OWL concepts, and the OWL instances are assigned data type properties and object properties. Subsequently, each of the OWL classes and relations between them, each of the OWL concepts, and each of the OWL instances are included to form the OWL ontology.

31 Claims, 10 Drawing Sheets

(56) References Cited

OTHER PUBLICATIONS

Koide et al., "OWL vs. Object Oriented Programming", Koide, S., J. Aasman, S. Haflich: OWL vs. Object Oriented Programming, the 4th International Semantic Web Conference (ISWC 2005), Workshop on Semantic Web Enabled Software Engineering (SWESE), (2005).*

Quastho_, M., Meinel, C.: Semantic Web Admission Free—Obtaining RDF and OWL Data from Application Source Code. In Kendall, E.F., Pan, J.Z., Sabbouh, M., Stojanovic, L., Bontcheva, K., eds.: Proceedings of the 4th International Workshop on Semantic Web Enabled Software Engineering (SWESE). (2008).*

Aditya Kalyanpur, Bijan Parsia, Evren Sirin, and James Hendler. 2005. Debugging unsatisfiable classes in OWL ontologies. Web Semant. 3, 4 (Dec. 2005), 268-293.*

Ma, Yue, Zuoquan Lin, and Zhangang Lin. "Inferring with inconsistent OWL DL ontology: A multi-valued logic approach." Current Trends in Database Technology—EDBT 2006. Springer Berlin Heidelberg, 2006. 535-553.*

Zou, Youyong, Tim Finin, and Harry Chen. "F-owl: An inference engine for semantic web." Formal Approaches to Agent-Based Systems. Springer Berlin Heidelberg, 2005. 238-248.*

* cited by examiner

METHOD AND SYSTEM FOR CREATING OWL ONTOLOGY FROM JAVA

FIELD OF THE INVENTION

The present invention relates, in general, to creating a knowledge based representation from an object-oriented language. More specifically, the invention relates to a method and system for creating Web Ontology Language (OWL) ontology from Java.

BACKGROUND OF THE INVENTION

Object-Oriented Programming and Systems (OOPS) are programming paradigms that are modeled around "objects", where the objects are compilation of attributes and behaviors encapsulating an entity. One of the popular languages for OOPS is Java since it is a platform-independent language.

As the complexity of a source code (specifically in Java) increases, it becomes more difficult to assess the code. For instance, software maintenance is considered a vital step in Software Development Life Cycle (SDLC). A software maintenance engineer needs to comprehend the structure of software to evaluate the relations and the structures that exist between different parts of the software's source code. With an ever increasing complexity of a Java source code, the software maintenance engineer needs to spend more time to assess its maintainability.

Another key area that gets influenced by a Java source code's complexity is code querying or code mining. To mine the relevant domain knowledge and class hierarchies from a Java source code, one needs to understand the conceptual structure of the Java source code. When the Java source code is large and complex, the time taken to understand its conceptual structure increases manifolds. Further, owing to the complexity of such a large source code, the code mining techniques may suffer from long response times.

Re-engineering is yet another area that is dependent on the complexity of a Java source code. Re-engineering involves re-implementing legacy codes by restructuring and translating the legacy codes to a more modern programming language. Further, the documentation of legacy codes is usually scarce or may not even be available at all. Consequently, knowledge repositories based on Java source code are useful for re-engineering such legacy codes.

Therefore, there is a need to abstract knowledge from a source code in an OOPS language, specifically Java, to derive useful information from it.

Web Ontology Language (OWL) is a knowledge-based representation of entities. It describes the problem domain and semantic relations of entities. Further, it encompasses the expressive and reasoning power of Description Logic (DL). Also, there are conceptual similarities between an OOPS language, specifically Java, and OWL since both these languages are modeled around objects (or instances).

There are some existing solutions that build upon these conceptual similarities to generate Java code from an OWL ontology. For instance, OWLDoc is a tool that generates JavaDoc style HTML page documentation from an OWL ontology. Another related work has been described in "Automatic Mapping of OWL Ontologies into Java" authored by A. Kalyanpur, D. J. Pastor, S. Battle, J. Padget, and published in the Proceedings of Software Engineering and Knowledge Engineering (SEKE04), 2004. The authors proposed a tool for automatically mapping OWL ontologies to Java. However, no substantial work is available for converting a Java source code to OWL.

In light of the above discussions, there is a need for a method and a system to create an OWL ontology from a Java source code.

BRIEF SUMMARY OF THE INVENTION

The invention provides a method for creating an OWL ontology from a Java source code, wherein the Java source code includes a plurality of Java classes. Each of these Java classes includes one or more Java members and is associated with one or more Java objects. The Java objects are used to instantiate each of the Java classes. An OWL class is created for each of the Java classes and an OWL concept is created for each of the Java members. Further, an OWL instance is created for each of the Java objects. Each of the OWL classes, the OWL concepts, and the OWL instances are assigned appropriate data type properties. Subsequently, each of the OWL classes, each of the OWL concepts, and each of the OWL instances are added as ABox (Assertional Box) axioms to the OWL ontology.

A system is provided for creating an OWL ontology from a Java source code. The system includes a parsing module that extracts the Java classes, the Java members, and the Java objects from the Java source code. The system also includes a mapping module and a storage module. The mapping module creates the OWL ontology by creating an OWL class for each of the Java classes, an OWL concept for each of the Java members, and an OWL instance for each of the Java objects. The storage module then stores the OWL ontology in the form of a knowledge base.

The invention thus finds key conceptual similarities between Java and OWL, such as class, method, and relation between them and thereof provides a mapping algorithm for converting a Java source code to an OWL ontology. The OWL ontology may further be queried to obtain valuable information, such as class hierarchy, class properties, particulars about instances, and the like.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION

The invention provides a method, system, and computer program product for creating an OWL ontology from a Java source code, wherein the Java source code includes a plurality of Java classes. Each of these Java classes includes one or more Java members and is associated with one or more Java objects. The Java objects are used to instantiate each of the Java classes.

Figure 1:
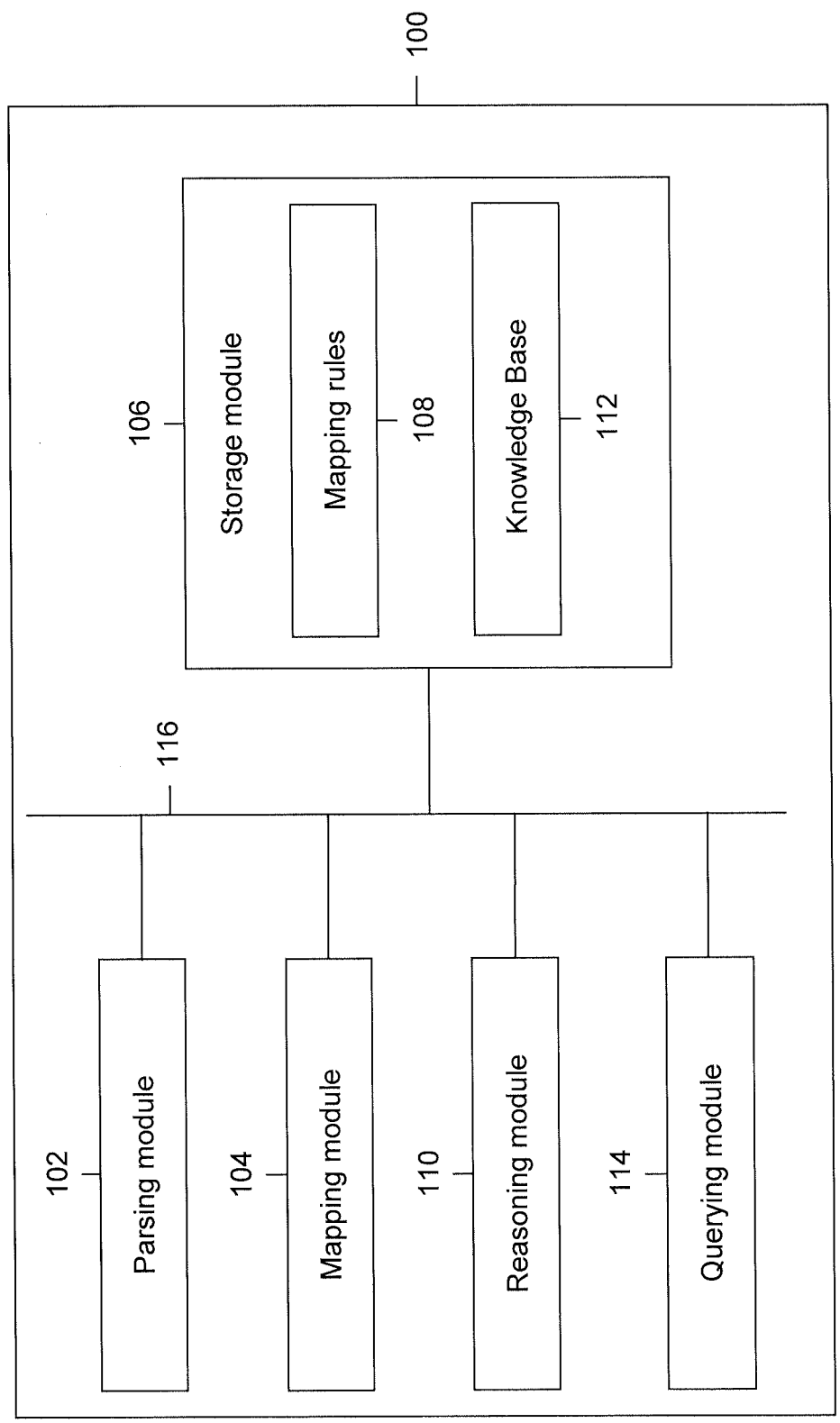
FIG. 1 illustrates a system in which various embodiments of the invention may be practiced, in accordance with an embodiment of the invention.

FIG. 1 illustrates a system 100 in which various embodiments of the invention may be practiced. System 100 includes a parsing module 102, a mapping module 104, a storage module 106, a reasoning module 110, and a querying module 114. Further, storage module 106 contains mapping rules 108 and a knowledge base 112. A communication link 116 allows a bi-directional communication between each of these modules. In a preferred embodiment of the invention, communication link 116 may be wired, wireless, or a combination of both.

To create the OWL ontology, an algorithm is designed to capture the key conceptual similarities between Java and OWL, such as class, method, and relationship between them. Therefore, classes, methods, and objects are extracted from the Java source code and corresponding OWL classes, OWL concepts, and OWL instances are created to form an OWL ontology. The OWL ontology may then be queried to obtain useful information, such as class hierarchies, class properties, particulars about instances, and the like.

In FIG. 1, parsing module 102 extracts a plurality of Java classes, one or more Java members, and one or more Java objects from a Java source code. Mapping module 104 creates an OWL class for each of the plurality of Java classes, an OWL concept for each of the one or more Java members, and an OWL instance for each of the one or more Java objects. Further, mapping module 104 adds each of the OWL classes, each of the OWL concepts, and each of the OWL instances to an OWL ontology. Storage module 106 stores mapping rules 108 and knowledge base 112, where mapping rules 108 defines the logic for creating the OWL ontology from the Java source code and knowledge base 112 stores the OWL ontology as axioms, such that the axioms describe the relations between OWL instances and OWL classes. Reasoning module 110 checks the consistency of the OWL ontology created from the Java source code. Querying module 114 can be used to query the OWL ontology stored in knowledge base 112.

In another embodiment of the invention, mapping rules 108 may be stored in knowledge base 112. In yet another embodiment of the invention, mapping module 104 may perform the extraction of the Java classes, the Java members, and the Java objects from the Java source code.

Figure 2A:
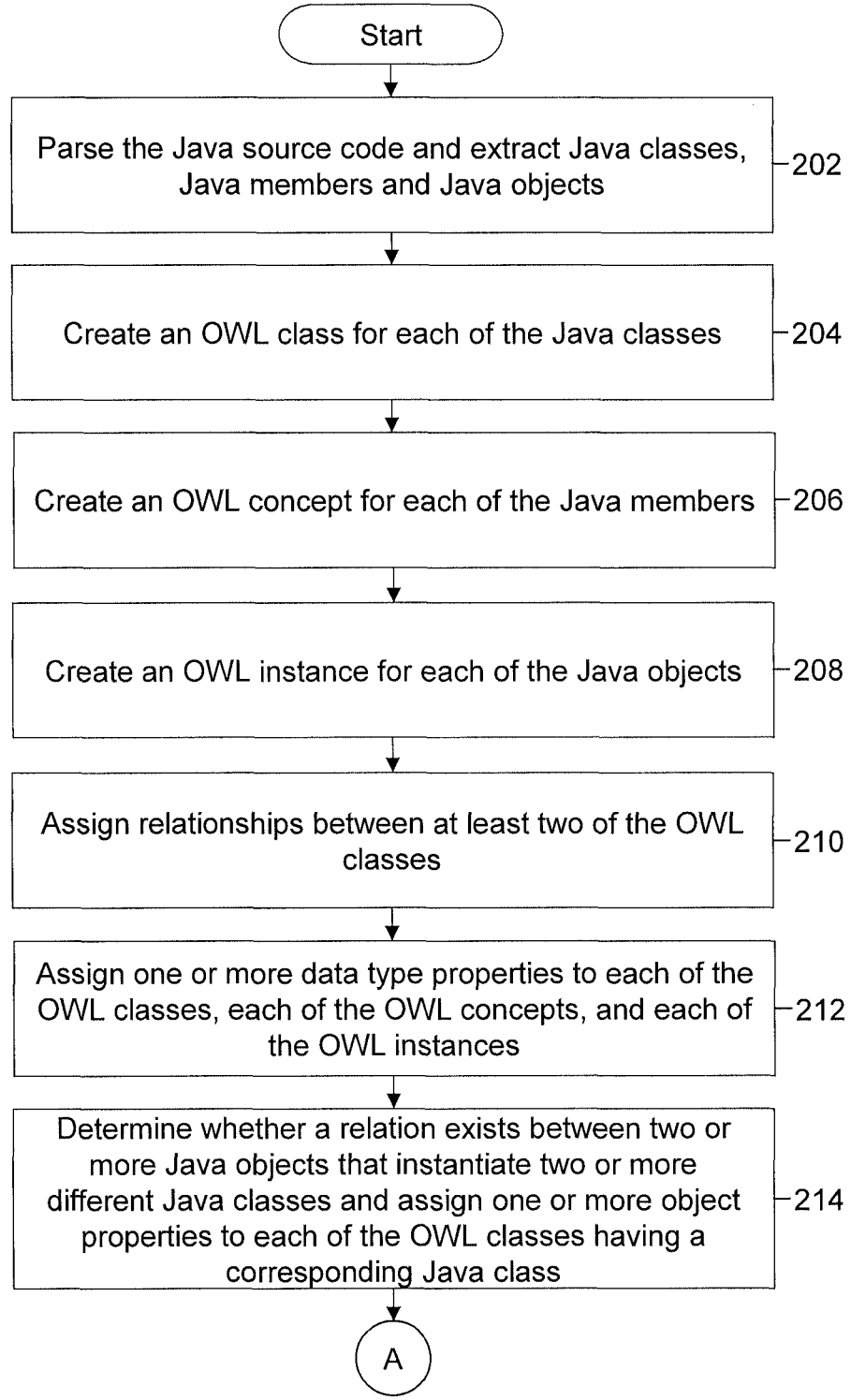
FIGS. 2A and 2B illustrate a flowchart of a method for creating an OWL ontology from a Java source code, in accordance with an embodiment of the invention.
Figure 2B:
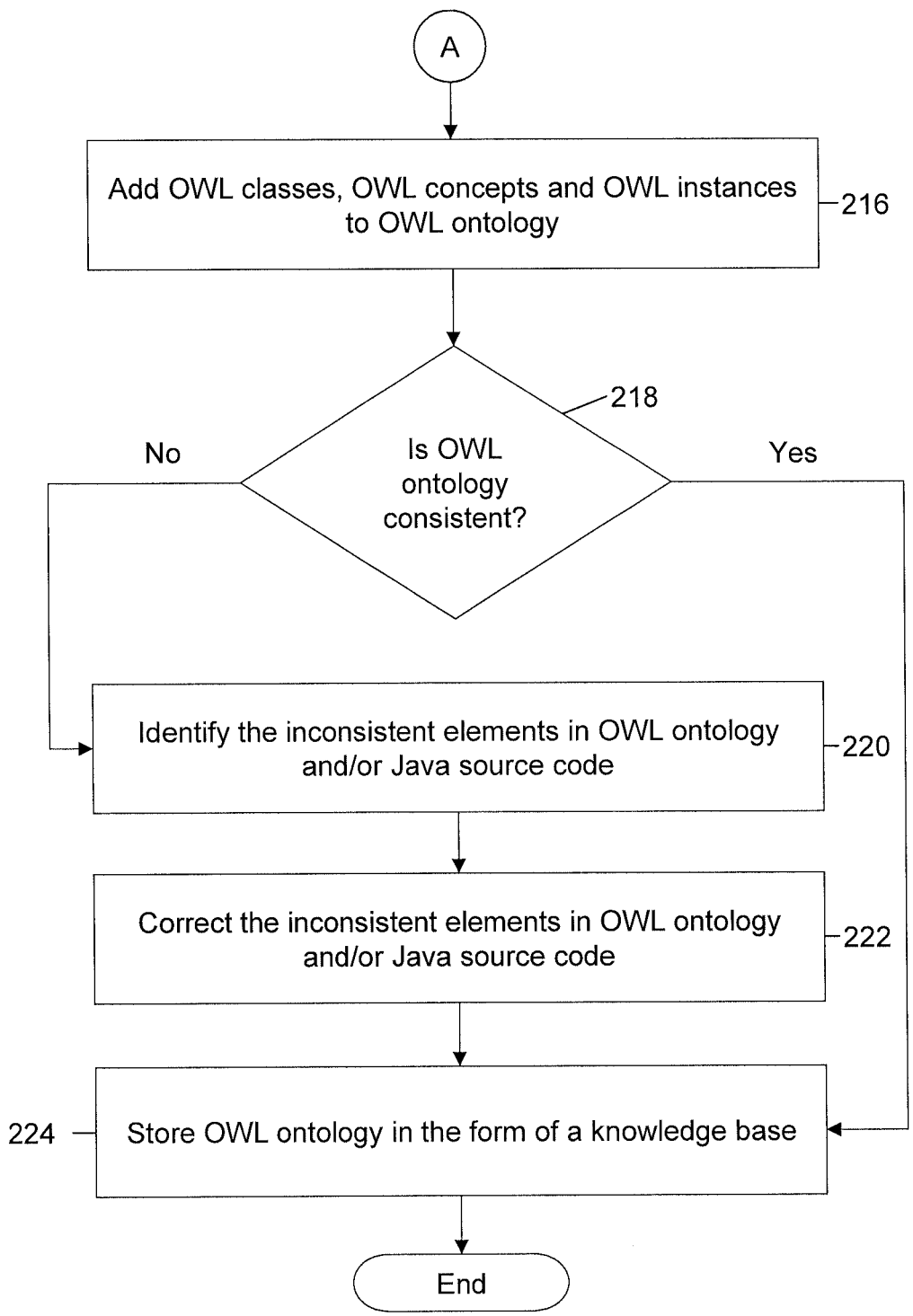

FIGS. 2A and 2B illustrate a flowchart of a method for creating an OWL ontology from a Java source code, in accordance with an embodiment of the invention. The invention will now be described in conjunction with FIG. 1, FIG. 2A, and FIG. 2B.

In an exemplary embodiment of the invention, the following Java source code snippet will be converted to OWL:

```
interface Animal
{....
}
public class Cat implements Animal
{...
    public string bully (Dog a)
    { ...
    }
}
class Dog implements Animal
{....
}
Class Alsatian extends Dog
{...
}
Cat Garfield = new Cat ( );
Dog Odie = new Dog ( );
Alsatian Boggie = new Alsatian ( );
Garfield.bully (Odie);
Garfield.bully (Boggie);
```

At step 202, a parsing module, such as parsing module 102, parses the Java source code to extract the Java classes, the Java members, and the Java objects. The Java objects instantiate each of the Java classes. Hence, the Java classes "Animal", "Cat", "Dog", and "Alsatian" are extracted from the Java source code snippet. The Java classes are identified by a mapping rules engine, such as mapping rules 108, using keywords such as, but not limited to, "interface" and "class". Further, the Java member "bully" and the Java objects, "Garfield", "Odie", and "Boggie" that instantiate the Java classes "Cat", "Dog", and "Alsatian", respectively, are extracted from the Java source code snippet.

At step 204, a mapping module, such as mapping module 104, creates an OWL class for each of the Java classes. With reference to the Java source code snippet, the mapping module creates OWL classes "Animal", "Cat", "Dog", and "Alsatian".

At step 206, the mapping module creates an OWL concept for each of the Java members. Since OWL is modeled around classes, the Java members are essentially converted into OWL concepts which are suffixed with the name of the OWL class to which they belong. Therefore, with reference to the Java source code snippet, the OWL concept "bully_Cat" is created corresponding to the Java member "bully".

At step 208, the mapping module creates an OWL instance for each of the Java objects. In an embodiment of the invention, the conversion utilized for creating an OWL instance for each of the Java objects may be, but is not limited to, the following:

| Java | OWL |
|---|---|
| (class) A obj; Obj = new A ( ); | A (obj) |
| (class) A obj = new A ( ); | A (obj) |

With reference to the Java source code snippet, the mapping module creates OWL instances "Garfield", "Odie", and "Boggie".

At step 210, the mapping module determines the relationships between at least two Java classes of the plurality of Java classes. The relationships are determined by the mapping rules engine using keywords such as, but not limited to, "implements" and "extends". Thereafter, mapping module associates the determined relationships between at least two of the OWL classes, wherein each OWL class has a corresponding Java class. With reference to the Java source code snippet, relationships exist between Java classes "Animal", "Cat", "Dog", and "Alsatian", wherein "Cat" and "Dog" inherit all the Java members of "Animal", while "Alsatian" inherits all the Java members of "Dog". Therefore, the determined relationships associated between the corresponding OWL classes are the following:

Cat subclassOf Animal;
Dog subclassOf Animal;
Alsatian subclassOf Dog;

The following are the relationships that may be associated between at least two OWL classes, wherein each OWL class has a corresponding Java class:

| Java | OWL |
| --- | --- |
| (abstract) class A | A |
| interface IntA | |
| class A implements IntA | |
| class A extends class B | A subclassOf B |
| class A implements IntB | |
| class A extends class B, class B extends class A | A equivalentClass B |
| interface IntA extends IntB, interface IntB extends IntA | |
| interface IntA extends IntB, IntC | A subClassOf unionOf(B,C) |
| class A implements IntB, IntC | A subClassOf unionOf(B,C) intersectionOf(B,C) superClass A |
| interface IntB, IntC extends IntA | |

At step 212, the mapping module assigns appropriate datatype properties to each of the OWL classes, each of the OWL concepts, and each of the OWL instances. The datatype properties essentially link OWL instances to datatype values. In an embodiment of the invention, datatype properties are also assigned to the OWL classes and the OWL concepts. The datatype properties that may be associated with classes in OWL include, but are not limited to, the following:

dtp_isInterface: true if the class is an interface
dtp_isAbstract: true if the class is declared abstract
dtp_isStatic: true if the class or the method is declared static
dtp_isFinal: true if the class or the method is immutable
dtp_isInit_method: true if it is a main method in Java
dtp_isConstructor_method: true if the method is a constructor of the class
dtp_access: used to capture the access modifier of the class or the method To assign datatype properties, the mapping rules engine extracts a plurality of keywords associated with each Java class of the plurality of Java classes and each Java member of the one or more Java members of the Java source code. Thereafter, the mapping module assigns an appropriate data type property for each extracted keyword to each of the OWL classes, wherein each OWL class has a corresponding Java class and to each of the OWL concepts, wherein each OWL concept has a corresponding Java member. With reference to the Java source code snippet, the plurality of keywords associated with the plurality of Java classes include "interface" and "public", wherein "public" defines the access modifier of the plurality of Java classes. Further, the keyword associated with the Java member is "public", wherein "public" defines the access modifier of the Java member. When the plurality of keywords include access modifiers such as "public", "private", and "protected", a datatype property dtp_access is assigned to each of the OWL classes and to each of the OWL concepts. Based on the Java source code snippet, a few datatype properties assigned by the mapping module to the OWL classes and the OWL concepts are, but are not limited to, the following:

dtp_isInterface (Animal1, true);
dtp_access (Animal1, default);
dtp_access (Garfield, public);
. . .
dtp_access (bully_Garfield, public);

The above enumerated datatype properties assigned to the OWL classes and the OWL concepts in the Java source code snippet will now be discussed in detail.

To fetch results of queries executed on an OWL ontology, OWL instances corresponding to each OWL class are required. Therefore, even for an interface class, a pseudo OWL instance needs to be created. While assigning a datatype property to the interface "Animal", the following axiom is added to create a pseudo OWL instance "Animal1" of the interface "Animal":

Animal (Animal1);

Thereafter, a datatype property dtp_isInterface is assigned to the pseudo OWL instance "Animal1". A corresponding datatype property, viz. dtp_isInterface is instantiated by assigning a datatype value "true" to "Animal1". Further, Java provides access protections at two levels—class/interface level and member level. The datatype property dtp_access is used to capture access protection at class/interface level, wherein dtp_access is assigned a range "public" for an OWL class corresponding to each Java class, while the range is "default" for an OWL interface. Further, to capture access protection at member level, the datatype property dtp_access is assigned a range "public" for an OWL concept corresponding to each Java member. However, a suffix is added to the name of the OWL concept to indicate which OWL class it belongs to.

The mapping module also determines one or more data values associated with each of the one or more Java objects and assigns datatype properties to each of the one or more OWL instances, wherein each OWL instance has a corresponding Java object. In an alternate embodiment of the invention, while creating the OWL ontology from the Java source code, variables in Java may also be assigned a datatype property.

In another embodiment of the invention, the mapping module may utilize datatype properties to capture overloading of two or more Java members, wherein the Java members belong to two or more different Java classes and have a same name. For instance, in the following example:

```
public class quad_Animal
{
    walkonLand (int leg, int hand)
    {...
    }
}
public class Human
{
    walkonLand (int leg)
    {...
    {
}
```

"walkonLand" is a Java member common to Java classes "quad_Animal" and "Human". While converting this Java member to OWL, the mapping module will associate the following datatype property: dtp_walkonLand (quad_Animal U Human, "string"), wherein for the Java member "walkonLand" of Java class "quad_Animal", the range assigned is "int-int", while for the Java member "walkonLand" of Java class "Human" the range assigned is "int". In yet another embodiment of the invention, the mapping module may utilize a similar technique to capture overloading of two or more Java constructors of a Java class, wherein the Java constructors have the same name as that of the Java class.

At step 214, the mapping module determines whether there exists a relation between at least two Java objects of the one or more Java objects, wherein the at least two Java objects instantiate two different Java classes of the plurality of Java classes. If a relation exists between at least two Java objects, an object property is assigned to each of the OWL classes, wherein each OWL class has a corresponding Java class. The object properties are essentially used to link an OWL instance with another OWL instance. In an embodiment of the invention, a relation exists if a Java object associated with a Java class is passed as a parameter to a Java member associated with a different Java class. For example, in the following Java source code snippet:

Garfield.bully (Odie);
Garfield.bully (Boggie);

the Java object "Odie" associated with class "Dog" is passed as a parameter to the Java member "bully" belonging to Java class "Cat". Consequently, the Java code Garfield.bully(Odie) corresponds to an object property hasbully (Garfield, Odie) in OWL, wherein Java object "Garfield" instantiates Java class "Cat", while Java object "Odie" instantiates Java class "Dog". Similarly, the Java code Garfield.bully (Boogie) corresponds to an object property hasbully (Garfield, Boogie) in OWL. In another embodiment of the invention, more than one Java objects may be passed as parameters to a Java member associated with a different Java class. For instance, in the following example,

```
class Technician
{....
}
class Developer
{....
}
class Engineer
{
public string colleague (Technician a, Developer b)
}
Technician obj1= new Technician ( );
Developer obj2 = new Developer ( );
Engineer obj3 = new Engineer ( );
obj3.colleague (obj1, obj2);
```

Java objects "obj1" and "obj2" associated with Java classes "Technician" and "Developer", respectively, are passed as parameters to a Java member "colleague" belonging to a Java class "Engineer". Consequently, the Java code obj3.colleague (obj1, obj2) will be assigned a corresponding object property.

At step 216, the mapping module adds each of the OWL classes, each of the OWL concepts and each of the OWL instances to an OWL ontology. A knowledge base, such as knowledge base 112, includes two components, a TBox (Terminological Box) and an ABox (Assertional Box). The axioms in TBox describe class hierarchies, i.e., the relations between OWL classes (concept definitions and inclusion axioms). On the contrary, the axioms in ABox describe where in the class hierarchy do instances belong, i.e., relations between OWL instances and OWL classes (role assertions), and facts, in the form of instantiation of classes (concept assertions). In an embodiment of the invention, each of the OWL classes, each of the OWL concepts, and each of the OWL instances are added as ABox axioms to the OWL ontology.

At step 218, a reasoning module, such as reasoning module 110, checks the consistency of the OWL ontology. In an embodiment of the invention, the reasoning module checks the assertions in the ABox. One of the assertions may be to check whether an OWL instance is actually an instance of an OWL class.

If an inconsistency is detected, step 220 is performed where the reasoning module identifies inconsistent elements in the OWL ontology. In another embodiment of the invention, the reasoning module may also identify inconsistent elements in the Java source code.

At step 222, the reasoning module corrects the inconsistent elements in the OWL ontology. In an alternate embodiment of the invention, the reasoning module may also correct the inconsistent elements in the Java source code.

At step 224, a storage module, such as storage module 106, stores the OWL ontology as the knowledge base.

Figure 3A:
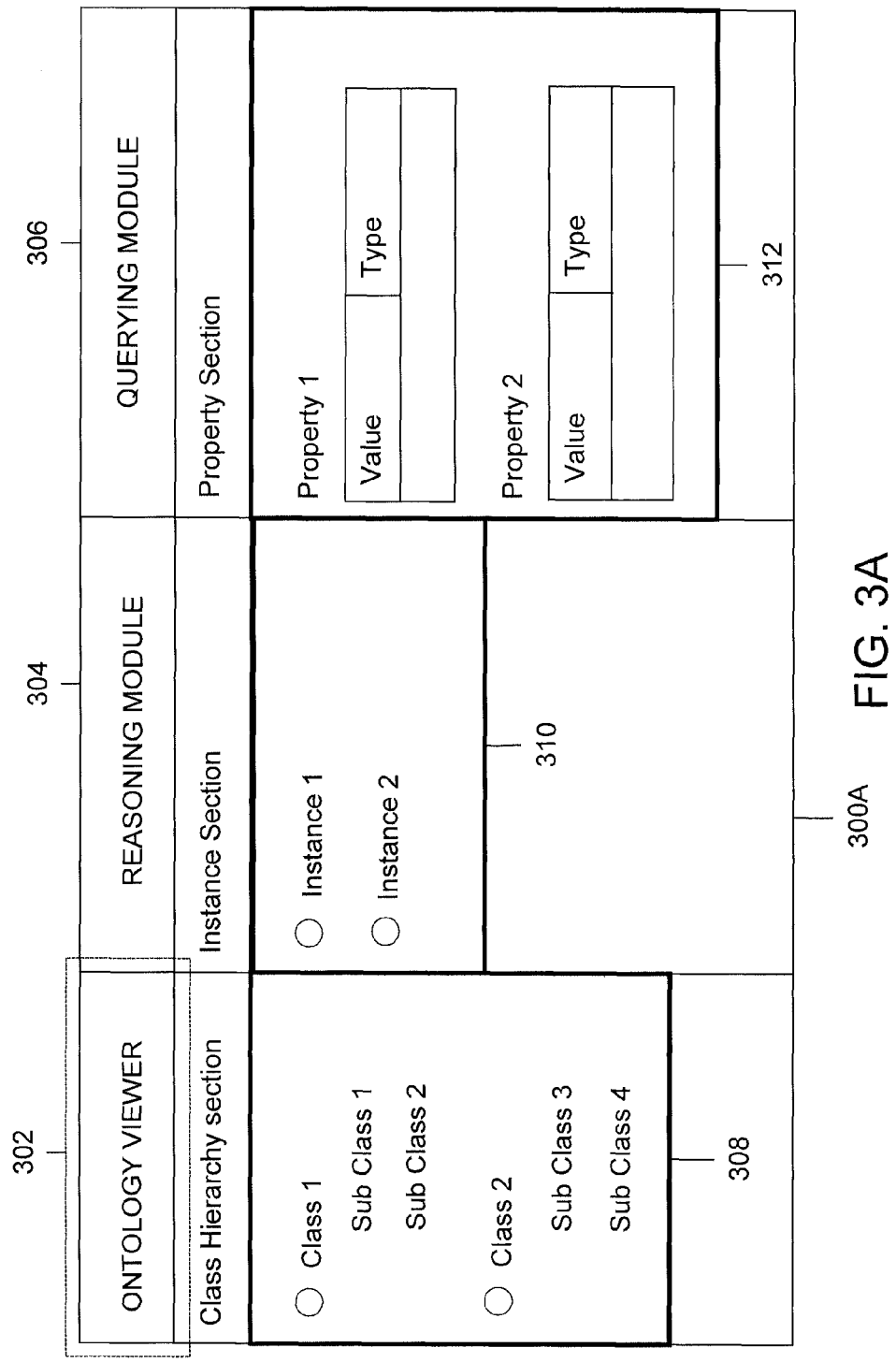
FIG. 3A illustrates an exemplary block diagram of a system for viewing an OWL ontology created from a Java source code, in accordance with an embodiment of the invention.

FIG. 3A illustrates an exemplary block diagram of a system 300A for viewing an OWL ontology created from a Java source code, in accordance with an embodiment of the invention. FIG. 3A includes an ontology viewer 302, a reasoning module 304, and a querying module 306. Ontology viewer 302 displays the details of an OWL ontology created from a Java source code. Reasoning module 304 conducts a consistency check and other inferencing tasks such as concept satisfiability, classification, and realization on the OWL ontology created from the Java source code. Further, querying module 306 is used to query the OWL ontology. Furthermore, ontology viewer 302, reasoning module 304, and querying module 306 may be third-party vendor tools that are employed to perform viewing, reasoning, and querying, respectively, on the OWL ontology created from the Java source code using the present invention.

When ontology viewer 302 is selected, a class hierarchy section 308, an instance section 310, and a property section 312 are displayed. In an embodiment of the invention, class hierarchy section 308, instance section 310 and property section 312 are displayed on a single GUI window. In another embodiment of the invention, class hierarchy section 308, instance section 310 and property section 312 may be displayed on separate GUI windows.

Class hierarchy section 308 enlists the OWL classes and OWL subclasses of an OWL ontology, wherein an OWL subclass inherits its properties from an OWL class. Instance section 310 displays the OWL instances of the OWL ontology. On clicking on an OWL class or an OWL subclass in class hierarchy section 308, the corresponding OWL instance(s) is displayed in instance section 310. Property section 312 displays both the datatype properties and the object properties associated with each OWL class and OWL subclass. In an embodiment of the invention, a "value" field and a "type" field may be assigned for each datatype property, wherein "value" denotes the value of the assigned property and "type" defines the datatype of the assigned property.

Figure 3B:
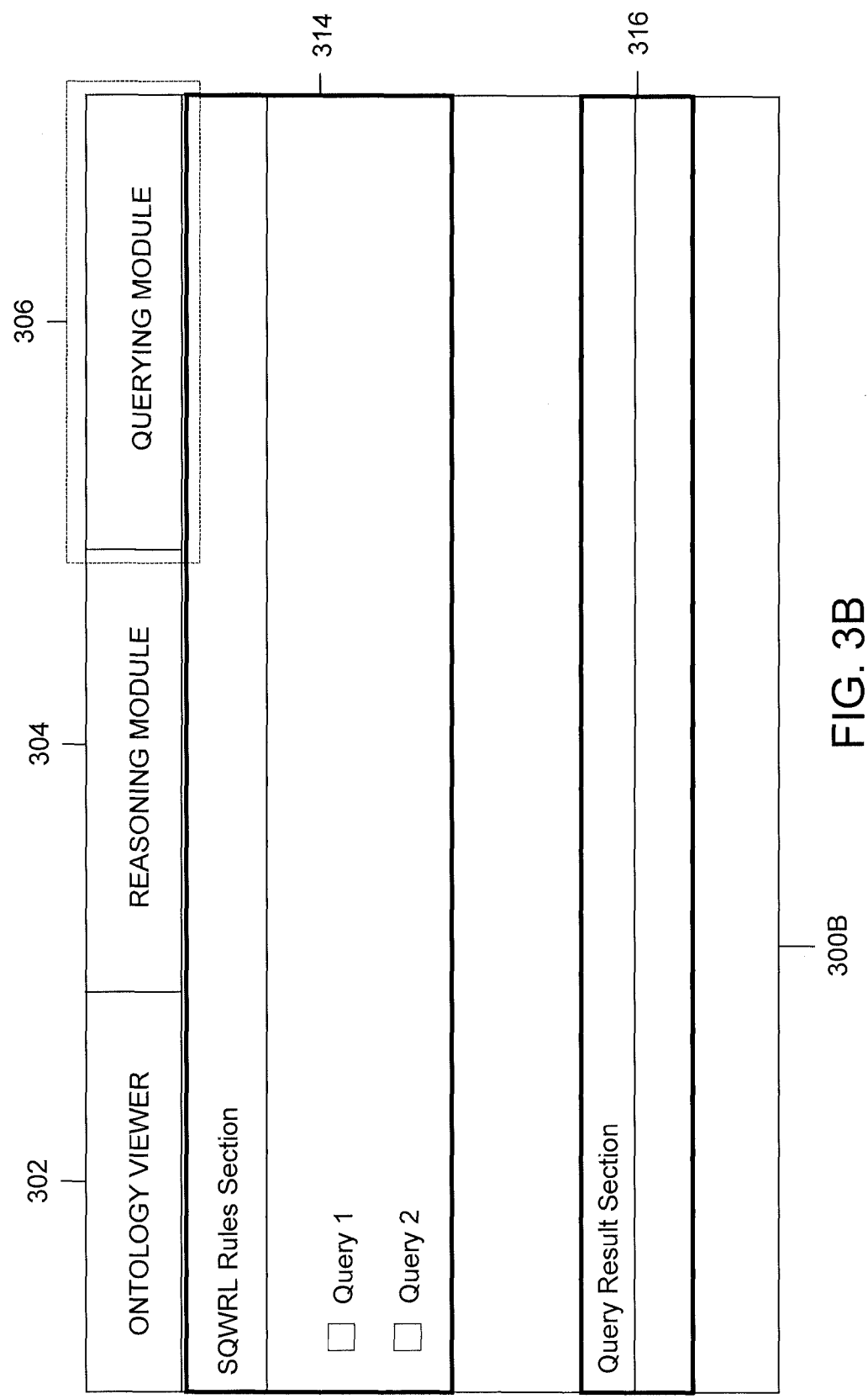
FIG. 3B illustrates an exemplary block diagram of a system for querying an OWL ontology created from a Java source code, in accordance with an embodiment of the invention.

FIG. 3B illustrates an exemplary block diagram of a system 300B for querying an OWL ontology created from a Java source code, in accordance with an embodiment of the invention. Semantic Query-Enhanced Web Rule Language (SQWRL) may be employed for querying the OWL ontology, wherein SQWRL is described in "SQWRL: a Query Language for OWL, OWL: Experiences and Directions (OWLED)" Authored by M. J. O'Connor and A. K. Das, Published in the Fifth International Workshop, Chantilly, Va., 2009. SQWRL is a SWRL-based query language and utilizes SQL-like operations to extract information from the OWL ontology. A generic syntax for a SQWRL rule is antecedent⇒ consequent In FIG. 3B, when querying module 306 is selected, a SQWRL rules section 314 and a query result section 316 are displayed. In SQWRL rules section 314, queries may be added, deleted, or modified. When a query is executed in SQWRL rules section 314, required knowledge is extracted from the OWL ontology, and the corresponding result is displayed in query result section 316. Therefore, querying module 306 facilitates mining knowledge from the OWL ontology stored in the knowledge base.

Figure 4A:
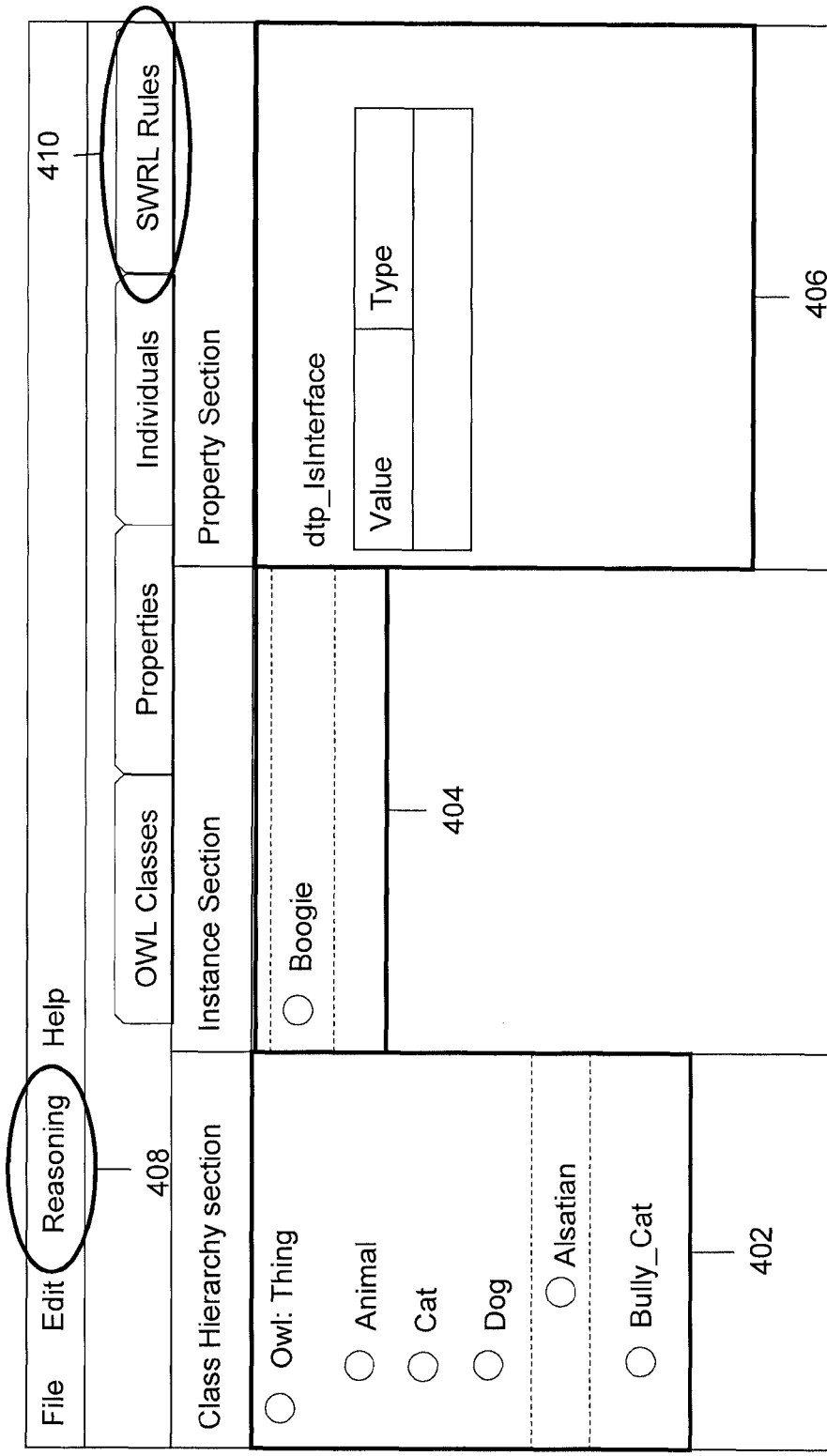
FIG. 4A illustrates a block diagram of a system for viewing an OWL ontology created from a Java source code, in accordance with an exemplary embodiment of the invention.

FIG. 4A illustrates a block diagram of a system 400A for viewing an OWL ontology created from a Java source code, in accordance with an exemplary embodiment of the invention.

System 400A may be embodied as a Graphical User Interface. The user interface may include a class hierarchy section 402 corresponding to class hierarchy section 308 of FIG. 3A. Class hierarchy section 402 enlists the OWL classes and OWL subclasses of an OWL ontology, wherein an OWL subclass inherits its properties from an OWL class. With reference to the Java source code snippet, class hierarchy section 402 enlists OWL class "Animal", and its OWL subclasses "Cat", "Dog", and "Alsatian", wherein "Alsatian" is also a subclass of "Dog". In another embodiment of the invention, class hierarchy section 402 may also enlist OWL concepts of the OWL ontology. With reference to the Java source code snippet, OWL concept "bully_Cat" is also displayed in class hierarchy section 402.

The user interface of system 400A may also include an instance section 404 corresponding to instance section 310 of FIG. 3A. With reference to the Java source code snippet, when OWL class "Alsatian" is selected in class hierarchy section 402, instance section 404 displays "Boogie" as an OWL instance of the OWL class "Alsatian". Similarly, if OWL class "Cat" is selected in class hierarchy section 402 (not shown in FIG. 4A), instance section 404 will display "Garfield" as an OWL instance of the OWL class "Cat".

Further, system 400A may include a property section 406 corresponding to property section 312 of FIG. 3A. With reference to the Java source code snippet, when OWL class "Alsatian" is selected in class hierarchy section 402, the corresponding datatype properties and the object properties (if any) assigned to "Alsatian" will be displayed in property section 406. Presently, since "Alsatian" is not an interface, its corresponding datatype property dtp_isInterface is vacant. Similarly, if OWL class "Animal" is selected in class hierarchy section 402 (not shown in FIG. 4A), its corresponding datatype property dtp_isInterface will show the pseudo OWL instance "Animal1" in the "value" field and string 'true" in the "type" field.

System 400A also includes a reasoning module 408 and a querying module 410 corresponding to reasoning module 304 and querying module 306 of FIG. 3A.

Figure 4B:
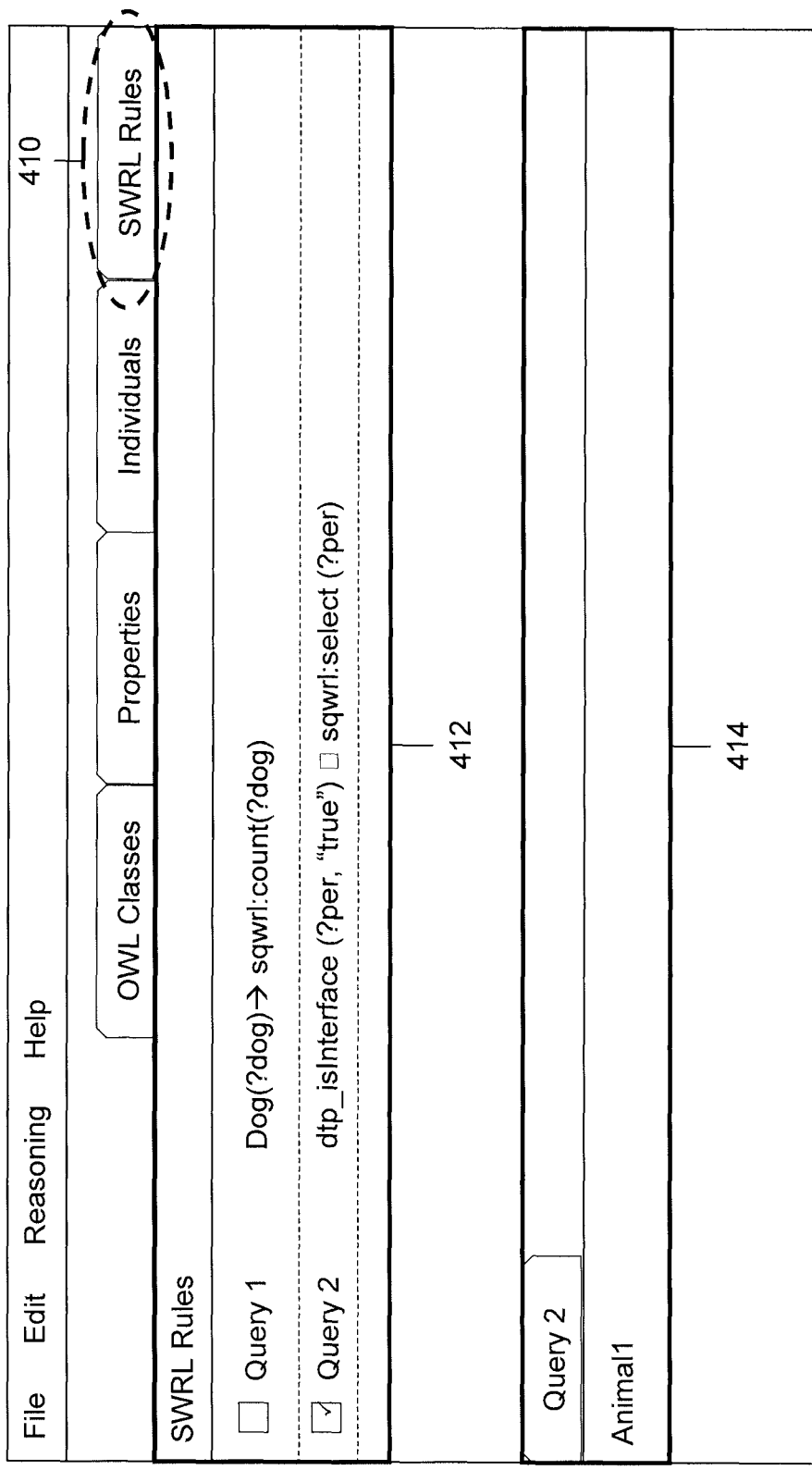
FIG. 4B illustrates a block diagram of a system for querying an OWL ontology created from a Java source code, in accordance with an exemplary embodiment of the invention.

FIG. 4B illustrates a block diagram of a system 400B for querying an OWL ontology created from a Java source code, in accordance with an exemplary embodiment of the invention. When querying module 410 is selected, a SQWRL rules section 412 and a query result section 414 are displayed corresponding to SQWRL rules section 314 and query result section 316 of FIG. 3B. SQWRL rules section 412 displays queries that have been executed on the OWL ontology created from the Java source code snippet, wherein the OWL ontology is stored in knowledge base 112. SQWRL rules are primarily used to extract information from the OWL ontology.

For instance, in SQWRL rules section 412, a query may retrieve the OWL instances which instantiate OWL classes that are essentially an interface, wherein the query may read: dtp_isInterface (?per, "true")⇒ sqwrl:select (?per). With reference to the Java source code snippet, the pseudo OWL instance "Animal1" is displayed in query result section 414 when the query is executed.

Figure 5A:
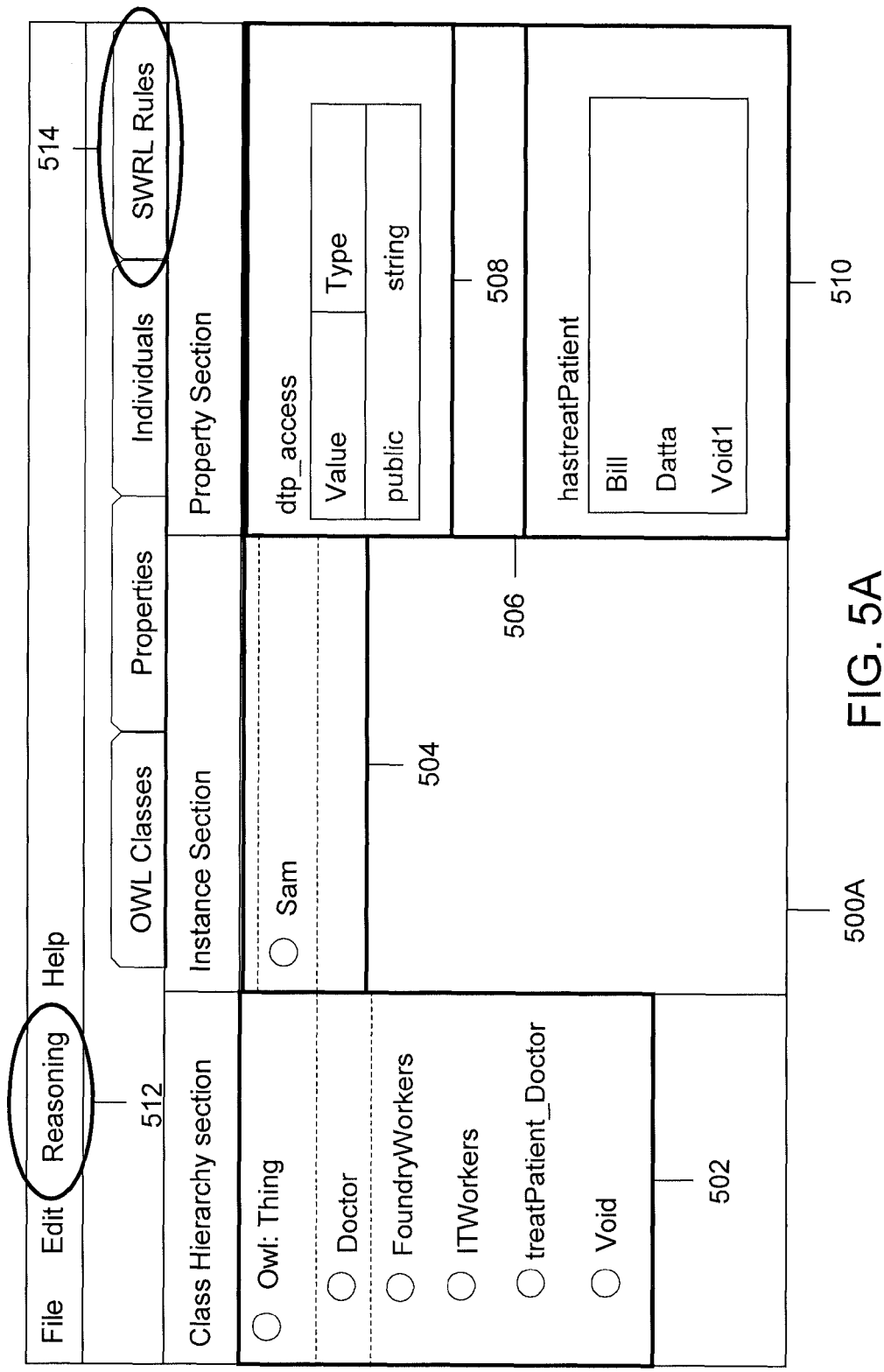
FIG. 5A illustrates a block diagram of a system for viewing an OWL ontology created from a Java source code, in accordance with another exemplary embodiment of the invention.

FIG. 5A illustrates a block diagram of a system 500A for viewing an OWL ontology created from a Java source code, in accordance with another exemplary embodiment of the invention.

In the exemplary embodiment of the invention, the following exemplary Java source code snippet is converted to OWL:

```
public class ITWorkers
{...
}
public class FoundryWorkers
{...
}
public class Doctor
{....
    public treatpatient ( )
    {....
    }
    public treatpatient (ITWorkers I, FoundryWorkers F)
    {...
    }
}
Doctor Sam=new Doctor( );
ITWorkers Bill=new ITWorkers( );
FoundryWorkers Datta=new FoundryWorkers( );
....
Sam.treatpatient (Bill, Datta);
```

System 500A, which can be embodied as a GUI, may include a class hierarchy section 502 corresponding to class hierarchy section 308. Class hierarchy section 502 enlists the OWL classes and OWL subclasses of an OWL ontology, wherein an OWL subclass inherits its properties from an OWL class. With reference to the Java source code snippet, class hierarchy section 502 enlists OWL classes "Doctor", "FoundryWorkers", and "ITWorkers". In an embodiment of the invention, class hierarchy section 502 also enlists "Void" as an OWL class. "Void" is essentially a pseudo OWL class and which is created when an object property is assigned in the OWL ontology. The use of a pseudo OWL class will be discussed in the subsequent paragraph.

With reference to the Java source code snippet, Java objects associated with Java classes "ITWorkers" and "FoudryWorkers" are passed as parameters to a Java member "treatpatient" belonging to Java class "Doctor". Consequently, the Java code Sam.treatpatient (Bill,Datta) is mapped to an object property hastreatpatient (Sam, Bill Π Datta) in OWL, wherein Java object "Sam" instantiates Java class "Doctor", while Java objects "Bill" and "Datta" instantiate Java classes "ITWorkers" and "FoundryWorkers", respectively. When the Java member "treatpatient" receives no arguments, an OWL instance "Void1" of the pseudo OWL class "Void" is used to generate the object property hastreatpatient (Sam, Void1). In yet another embodiment of the invention, class hierarchy section 502 may also enlist OWL concepts of the OWL ontology. With reference to the Java source code snippet, OWL concept "treatpatient_Doctor" is also displayed in class hierarchy section 502.

System 500A may also include an instance section 504 corresponding to instance section 310 of FIG. 3A. With reference to the Java source code snippet, when OWL class "Doctor" is selected in class hierarchy section 502, instance section 504 displays "Sam" as an OWL instance of the OWL class "Doctor". Similarly, if OWL class "ITWorkers" is selected in class hierarchy section 502 (not shown in FIG. 5A), instance section 504 will display "Bill" as an OWL instance of the OWL class "ITWorkers".

Further, system 500A may include a property section 506 corresponding to property section 312 of FIG. 3A. With reference to the Java source code snippet, when OWL class "Doctor" is selected in class hierarchy section 502, a datatype property section 508 and a object property section 510 assigned to "Doctor" will be displayed in property section 506. Since "Sam" is an instance of OWL class "Doctor", the datatype property and the object property assigned to "Doctor" will also be associated with "Sam". Datatype property section 508 illustrates that access modifier associated with "Sam" is "public", while object property section 510 illustrates that "Bill", "Datta", and "Void1" are the OWL instances with which "Sam" is related.

System 500A may also include a reasoning module 512 and a querying module 514 corresponding to reasoning module 304 and querying module 306, respectively, of FIG. 3A.

Figure 5B:
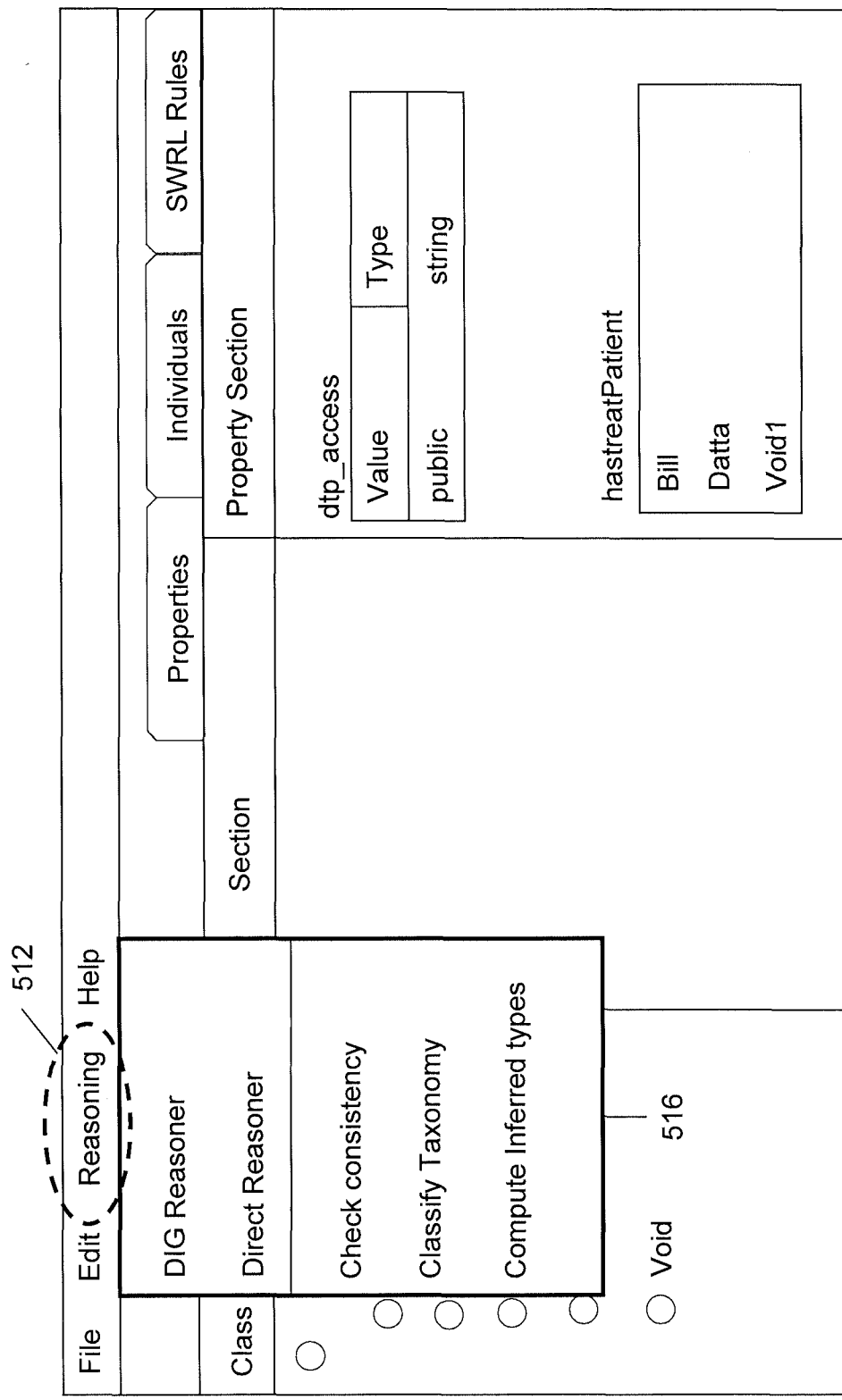
FIG. 5B illustrates a block diagram of a system for performing reasoning on an OWL ontology created from a Java source code, in accordance with another exemplary embodiment of the invention.

FIG. 5B illustrates a block diagram of a system 500B for performing reasoning on an OWL ontology created from a Java source code, in accordance with another exemplary embodiment of the invention. When reasoning module 512 is selected, an option window 516 is displayed. In an embodiment of the invention, the options displayed in option window 516 may be, but are not limited to, "check consistency", "classify taxonomy", and "compute inferred types". By "check consistency" option, the OWL ontology is checked for contradictory facts. Further, by "classify taxonomy" option, a complete OWL class hierarchy is created by computing OWL subclass relations between every OWL class. Furthermore, by "compute inferred types" option, all inferred types of an OWL instance are computed. For instance, in the following example, class A
class B
B subclassOf A
B (Instance1)

"Instance1" has direct type class B and an indirect type class A, because class B is a subclass of class A. Thus, all the inferred types of "Instance1" will be {class A, class B}.

In an embodiment of the invention, a Description Logic Implementation Group (DIG) interface may be used to perform reasoning on the OWL ontology, wherein the DIG interface is a standard interface/protocol that provides uniform access to Description Logic Reasoners. In another embodiment of the invention, a direct reasoner may also be used to perform reasoning on the OWL ontology. In accordance with the embodiment of the invention, the direct reasoner is Pellet®.

Figure 5C:
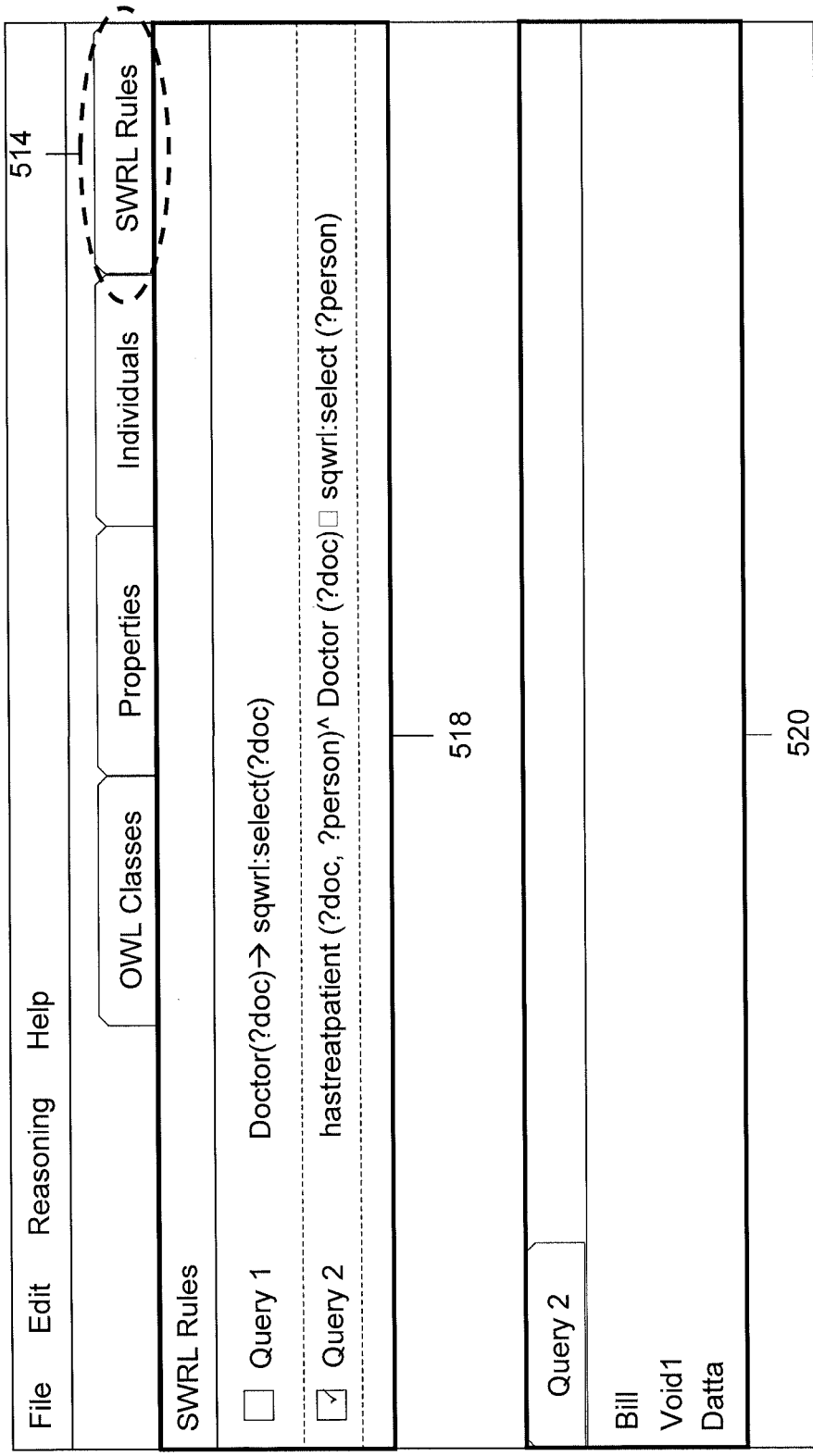
FIG. 5C illustrates a block diagram of a system for querying an OWL ontology created from a Java source code, in accordance with another exemplary embodiment of the invention.

FIG. 5C illustrates a block diagram of a system 500C for querying an OWL ontology created from a Java source code, in accordance with another exemplary embodiment of the invention.

When querying module 514 is selected, a SQWRL rules section 518 and a query result section 520 are displayed corresponding to SQWRL rules section 314 and query result section 316 of FIG. 3B. SQWRL rules section 518 displays queries that have been executed on the OWL ontology created for the Java source code snippet, wherein the OWL ontology is stored in the knowledge base. SQWRL rules are primarily used to retrieve information from the OWL ontology. For instance, in SQWRL rules section 518, a query may retrieve the OWL instances that have been treated by an OWL instance of class "Doctor", wherein the query may read:

hastreatpatient (?doc, ?person)^ Doctor (?doc) ⇒ sqwrl:select (?person).

With reference to the Java source code snippet, when the query is executed, OWL instances "Bill", "Datta", and "Void1" are displayed in query result section 520.

Similarly, a query may be executed to determine the real patients treated by an OWL instance of class "Doctor", wherein the query may read:

--- hastreatpatient (?doc, ?person)^ Doctor (?doc) ^Void(?V)
^differentFrom(?person, ?V) ⇒ sqwrl:select (?person).

---

With reference to the Java source code snippet, OWL instances "Bill" and "Datta" will be displayed in query result section 520 (not shown in FIG. 5C).

The method and the system described above have numerous advantages. The present invention finds key conceptual similarities between Java and OWL, such as class and method, and relation between them and thereof provides a mapping algorithm for converting a Java source code to the OWL ontology. Each of the Java classes, the Java methods and the Java objects of the Java source code are converted into OWL by creating corresponding OWL classes, OWL concepts and OWL instances. Further, reasoning may be performed on the OWL ontology for checking inconsistency. Furthermore, the OWL ontology may be queried to obtain valuable information, such as class hierarchy and class properties.

The system for creating an OWL ontology from a Java source code, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, a microprocessor, an input device, a display unit and among other units of a computer. The microprocessor is connected to a communication bus. The computer also includes a computer usable medium such as a memory containing computer readable program codes. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or computer readable program code or other instructions into the computer system. The computer system also includes a communication unit. The communication unit allows the computer to connect to other databases and computers on a network through an I/O interface. The communication unit allows the transfer as well as reception of data from other databases. The communication unit may include a modem, an Ethernet card, or any similar device which enables the computer system to connect to databases and networks such as LAN, MAN, WAN, and the Internet. The computer system facilitates inputs from a user through input device, accessible to the system through I/O interface.

The computer system executes a set of program instruction means that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

The invention claimed is:

1. A computer-implemented method for creating Web Ontology Language ("OWL") ontology from an object-oriented programming language source code comprising a plurality of classes, the method comprising:
   creating, using program instructions executed by a computer system, an OWL class for each class of the plurality of classes from JAVA programming language source code, wherein each class of the plurality of classes comprises one or more members and one or more objects;
   creating, using program instructions executed by a computer system, an OWL concept for each of the one or more members; creating, using program instructions executed by a computer system, an OWL instance for each of the one or more objects, wherein each of the one or more objects instantiate a corresponding class of the plurality of classes;
   assigning, using program instructions executed by a computer system, one or more data type properties to each of the OWL classes, to each of the OWL concepts and to each of the OWL instances;
   adding, using program instructions executed by a computer system, each of the OWL classes, each of the OWL concepts and each of the OWL instances as Assertional Box axioms to the OWL ontology;
   facilitating checking for, using program instructions executed by a computer system, inconsistencies in the OWL ontology and inconsistencies in the JAVA programming language source code, wherein inconsistencies in the JAVA programming language source code are checked by drawing one or more inferences from an output of a check performed on the OWL ontology; and
   when an inconsistency is found in the JAVA programming language source code and an inconsistency is found in the OWL ontology, facilitating correction of, using program instructions executed by a computer system, the inconsistency in the OWL ontology and the inconsistency in the JAVA programming language source code, wherein the inconsistency in the JAVA programming language source code is corrected using the one or more inferences.

2. The method of claim 1 further comprising:
   determining, using program instructions executed by a computer system, relationships between at least two classes of the plurality of classes; and
   associating, using program instructions executed by a computer system, the determined relationships between at least two of the OWL classes, wherein each OWL class has a corresponding class of the plurality of classes from the JAVA programming language source code.

3. The method of claim 1, wherein assigning one or more data type properties to each of the OWL classes comprises:
   determining, using program instructions executed by a computer system, a plurality of keywords associated with each of the plurality of classes from the JAVA programming language source code; and
   assigning, using program instructions executed by a computer system, a data type property for each determined keyword to each of the OWL classes, wherein each OWL class has a corresponding class of the plurality of classes from the JAVA programming language source code.

4. The method of claim 1, wherein assigning one or more data type properties to each of the OWL concepts comprises:
   determining, using program instructions executed by a computer system, a plurality of keywords associated with each of the one more members from the JAVA programming language source code; and
   assigning, using program instructions executed by a computer system, a data type property for each determined keyword to each of the OWL concepts, wherein each OWL concept has a corresponding member from the JAVA programming language source code.

5. The method of claim 1, wherein assigning one or more data type properties to each of the OWL classes comprises:
   determining, using program instructions executed by a computer system, an access modifier associated with each class of the plurality of classes from the JAVA programming language source code; and
   assigning, using program instructions executed by a computer system, a data type property for each determined access modifier to each of the OWL classes, wherein each OWL class has a corresponding class of the plurality of classes from the JAVA programming language source code.

6. The method of claim 1, wherein assigning one or more data type properties to each of the OWL concepts comprises:
   determining, using program instructions executed by a computer system, an access modifier associated with each of the one more members from the JAVA programming language source code; and
   assigning, using program instructions executed by a computer system, a data type property for each determined access modifier to each of the OWL concepts, wherein each OWL concept has a corresponding member from the JAVA programming language source code.

7. The method of claim 1, wherein assigning one or more data type properties to each of the OWL instances comprises:
   determining, using program instructions executed by a computer system, one or more data values associated with each of the one or more objects from the JAVA programming language source code; and
   assigning, using program instructions executed by a computer system, the one or more data values as a datatype property to each of the OWL instances, wherein each OWL instance has a corresponding object from the JAVA programming language source code.

8. The method of claim 1 further comprising assigning one or more object properties to each of the OWL classes, wherein assigning one or more object properties to each of the OWL classes comprises:

determining, using program instructions executed by a computer system, a relation between at least two objects of the one or more objects from the JAVA programming language source code, wherein the at least two objects instantiate two different classes of the plurality of classes from the JAVA programming language source code; and assigning, using program instructions executed by a computer system, the determined relation as an object property to each of the OWL classes, wherein each OWL class has a corresponding class of the plurality of classes from the JAVA programming language source code.

9. The method of claim 1 further comprising:
storing, using program instructions executed by a computer system, the OWL ontology in the form of a knowledge base, wherein the OWL ontology is stored in one or more storage elements of the computer system.

10. The method of claim 9 further comprising querying, using program instructions executed by a computer system, the knowledge base to extract information from the OWL ontology.

11. A system for creating a Web Ontology Language ("OWL") ontology from an object-oriented programming language source code, the system comprising:
a parsing module in communication with a microprocessor and operative to:
extract a plurality of classes from JAVA programming language source code, each of the plurality of classes comprising one or more members and one or more objects, wherein each of the one or more objects instantiate a corresponding class of the plurality of classes;
extract the one or more members from the JAVA programming language source code; and
extract the one or more objects from the JAVA programming language source code;
a mapping module in communication with the microprocessor and operative to: create the OWL ontology from the plurality of classes from the JAVA programming language source code, one or more members from the JAVA programming language source code, and the one or more objects from the JAVA programming language source code;
a storage module in communication with the microprocessor and operative to: store the OWL ontology in the form of a knowledge base; and
a reasoning module in communication with the microprocessor and operative to:
facilitate checking for inconsistencies in the OWL ontology and inconsistencies in the JAVA programming language source code, wherein inconsistencies in the JAVA programming language source code are checked by drawing one or more inferences from an output of a check performed on the OWL ontology; and
when an inconsistency in the OWL ontology is found and an inconsistency in the JAVA programming language source code is found, facilitate correction of the inconsistency in the OWL ontology and the inconsistency in the JAVA programming language source code, wherein the inconsistency in the JAVA programming language source code is corrected using the one or more inferences.

12. The system of claim 11, wherein the mapping module is further operative to:
create an OWL class for each class of the plurality of classes from the JAVA programming language source code;
create an OWL concept for each of the one or more members from the JAVA programming language source code;
create an OWL instance for each of the one or more objects from the JAVA programming language source code;
assign one or more data type properties to each of the OWL classes, to each of the OWL concepts, and to each of the OWL instances; and
add each of the OWL classes, each of the OWL concepts and each of the OWL instances as Assertion Box axioms to the OWL ontology.

13. The system of claim 12, wherein the mapping module is further operative to:
determine relationships between at least two classes of the plurality of classes from the JAVA programming language source code; and
associate the determined relationships between at least two of the OWL classes, wherein each OWL class has a corresponding class of the plurality of classes from the JAVA programming language source code.

14. The system of claim 12, wherein the mapping module is further operative to:
determine a plurality of keywords associated with each class of the plurality of classes from the JAVA programming language source code; and
assign a data type property for each determined keyword to each of the OWL classes, wherein each OWL class has a corresponding class of the plurality of classes from the JAVA programming language source code.

15. The system of claim 12, wherein the mapping module is further operative to:
determine a plurality of keywords associated with each of the one more members from the JAVA programming language source code; and
assign a data type property for each determined keyword to each of the OWL concepts, wherein each OWL concept has a corresponding member from the JAVA programming language source code.

16. The system of claim 12, wherein the mapping module is further operative to:
determine an access modifier associated with each class of the plurality of classes from the JAVA programming language source code; and assign a data type property for each determined access modifier to each of the OWL classes, wherein each OWL class has a corresponding class of the plurality of classes from the JAVA programming language source code.

17. The system of claim 12, wherein the mapping module is further operative to:
determine an access modifier associated with each of the one more members from the JAVA programming language source code; and
assign a data type property for each determined access modifier to each of the OWL concepts, wherein each OWL concept has a corresponding member from the JAVA programming language source code.

18. The system of claim 12, wherein the mapping module is further operative to:
determine one or more data values associated with each of the one or more objects from the JAVA programming language source code; and
assign the one or more data values as a datatype property to each of the OWL instances, wherein each OWL instance has a corresponding object from the JAVA programming language source code.

19. The system of claim 12, wherein the mapping module is further operative to:
   determine a relation between at least two objects of the one or more objects from the JAVA programming language source code, wherein the at least two objects instantiate two different classes of the plurality of classes from the JAVA programming language source code; and
   assign the determined relation as an object property to each of the OWL classes, wherein each OWL class has a corresponding class of the plurality of classes from the JAVA programming language source code.

20. The system of claim 11, wherein the storage module is further operative to store mapping rules, the mapping rules configured to define a logic for creating the OWL ontology from the JAVA programming language source code.

21. The system of claim 11 further comprising a querying module in communication with the microprocessor and operative to query the knowledge base to extract information from the OWL ontology.

22. A non-transitory computer program product comprising computer usable medium having computer-readable program code stored thereon, the computer-readable program code comprising instructions that, when executed by a microprocessor, cause the microprocessor to:
   create an OWL class for each class of a plurality of classes from JAVA programming language source code, wherein each class of the plurality of classes comprises one or more members and one or more objects;
   create an OWL concept for each of the one or more members; create an OWL instance for each of the one or more objects, wherein each of the one or more objects instantiate a corresponding class of the plurality of classes;
   assign one or more data type properties to each of the OWL classes, to each of the OWL concepts and to each of the OWL instances;
   add each of the OWL classes, each of the OWL concepts and each of the OWL instances as Assertional Box axioms to the OWL ontology;
   facilitate checking for inconsistencies in the OWL ontology and inconsistencies in the JAVA programming language source code, wherein inconsistencies in the JAVA programming language source code are checked by drawing one or more inferences from an output of a check performed on the OWL ontology; and
   when an inconsistency is found in the OWL ontology and an inconsistency is found in the JAVA programming language source code, facilitate correction of the inconsistency in the OWL ontology and the inconsistency in the JAVA programming language source code, wherein the inconsistency in the JAVA programming language source code is corrected using the one or more inferences.

23. The non-transitory computer program product of claim 22, wherein the computer-readable code further comprises instructions that, when executed by the microprocessor, cause the microprocessor to:
   determine relationships between at least two classes of the plurality of classes; and
   associate the determined relationships between at least two of the OWL classes, wherein each OWL class has a corresponding class of the plurality of classes from the JAVA programming language source code.

24. The non-transitory computer program product of claim 22, wherein the computer-readable code for assigning one or more data type properties to each of the OWL classes comprises instructions that, when executed by the microprocessor, cause the microprocessor to:
   determine a plurality of keywords associated with each of the plurality of classes from the JAVA programming language; and
   assign a data type property for each determined keyword to each of the OWL classes, wherein each OWL class has a corresponding class of the plurality of classes from the JAVA programming language source code.

25. The non-transitory computer program product of claim 22, wherein the computer-readable code for assigning one or more data type properties to each of the OWL concepts comprises instructions that, when executed by the microprocessor, cause the microprocessor to:
   determine a plurality of keywords associated with each of the one more members from the JAVA programming language source code; and
   assign a data type property for each determined keyword to each of the OWL concepts, wherein each OWL concept has a corresponding member from the JAVA programming language source code.

26. The non-transitory computer program product of claim 22, wherein the computer-readable code for assigning one or more data type properties to each of the OWL classes comprises instructions that, when executed by the microprocessor, cause the microprocessor to:
   determine an access modifier associated with each class of the plurality of classes from the JAVA programming language source code; and
   assign a data type property for each determined access modifier to each of the OWL classes, wherein each OWL class has a corresponding class of the plurality of classes from the JAVA programming language source code.

27. The non-transitory computer program product of claim 22, wherein the computer-readable code for assigning one or more data type properties to each of the OWL concepts comprises instructions that, when executed by the microprocessor, cause the microprocessor to:
   determine an access modifier associated with each of the one more members from the JAVA programming language source code; and
   assign a data type property for each determined access modifier to each of the OWL concepts, wherein each OWL concept has a corresponding member from the JAVA programming language source code.

28. The non-transitory computer program product of claim 22, wherein the computer-readable code for assigning one or more data type properties to each of the OWL instances comprises instructions that, when executed by the microprocessor, cause the microprocessor to:
   determine one or more data values associated with each of the one or more objects from the JAVA programming language source code; and
   assign the one or more data values as a datatype property to each of the OWL instances, wherein each OWL instance has a corresponding object from the JAVA programming language source code, the datatype property assigned to each of the OWL instances corresponds to the datatype property assigned to the OWL class and the datatype property assigned to each of the OWL concepts associated with each of the OWL instances.

29. The non-transitory computer program product of claim 22, wherein the computer-readable code further comprises instructions that, when executed by the microprocessor, cause the microprocessor to assign one or more object properties to each of the OWL classes, further wherein assigning one or more object properties to each of the OWL classes further comprises instructions that, when executed by the microprocessor, cause the microprocessor to:

determine a relation between at least two objects of the one or more objects from the JAVA programming language source code, wherein the at least two objects instantiate two different classes of the plurality of classes from the JAVA programming language source code; and assign the determined relation as an object property to each of the OWL classes, wherein each OWL class has a corresponding class from the plurality of classes from the JAVA programming language source code.

30. The non-transitory computer program product of claim 22, wherein the computer-readable code further comprises instructions that, when executed by the microprocessor, cause the microprocessor to store the OWL ontology in the form of a knowledge base.

31. The non-transitory computer program product of claim 30, wherein the computer-readable code further comprises instructions that, when executed by the microprocessor, cause the microprocessor to query the knowledge base to extract information from the OWL ontology.

* * * * *